(12) United States Patent
Doza et al.

(10) Patent No.: US 6,864,199 B2
(45) Date of Patent: *Mar. 8, 2005

(54) CRACK-RESISTANT DRY REFRACTORY

(75) Inventors: Douglas K. Doza, Hilliard, OH (US); Dana G. Goski, Columbus, OH (US); Yuechu Ma, Columbus, OH (US)

(73) Assignee: Allied Mineral Products, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/361,051

(22) Filed: Feb. 7, 2003

(65) Prior Publication Data

US 2004/0157725 A1 Aug. 12, 2004

(51) Int. Cl.[7] .................. C04B 37/76; C04B 35/101
(52) U.S. Cl. ................. 501/95.1; 501/95.2; 501/127
(58) Field of Search ................... 501/95.1, 95.2, 501/127

(56) References Cited

U.S. PATENT DOCUMENTS

| | | | | |
|---|---|---|---|---|
| 3,607,608 A | 9/1971 | Siefert | ...... | 161/170 |
| 4,103,063 A | 7/1978 | Hulse | ...... | 415/212 R |
| 4,104,833 A | * 8/1978 | Glowacki | ...... | 451/28 |
| 4,208,214 A | 6/1980 | Stein et al. | ...... | 106/56 |
| 4,339,289 A | 7/1982 | Lankard | ...... | 156/91 |
| 4,366,255 A | 12/1982 | Lankard | ...... | 501/95 |
| 4,475,989 A | 10/1984 | Cain et al. | ...... | 202/251 |
| 4,513,040 A | 4/1985 | Lankard | ...... | 428/49 |
| 4,593,627 A | 6/1986 | Lankard et al. | ...... | 109/83 |
| 4,764,488 A | 8/1988 | Saito et al. | ...... | 501/95 |
| 4,806,168 A | 2/1989 | Ivarsson et al. | ...... | 106/104 |
| 4,873,209 A | 10/1989 | Gnyra | ...... | 501/95 |
| 5,033,721 A | 7/1991 | Gnyra | ...... | 266/280 |
| 5,104,833 A | 4/1992 | Matsumoto et al. | ...... | 501/104 |
| 5,284,808 A | 2/1994 | Damiano et al. | ...... | 501/103 |
| 5,308,806 A | 5/1994 | Maloney et al. | ...... | 501/95 |
| 5,324,352 A | 6/1994 | Hughes et al. | ...... | 106/284 |
| 5,459,114 A | 10/1995 | Kaya et al. | ...... | 501/96 |
| 5,552,354 A | 9/1996 | Harmuth et al. | ...... | 501/94 |
| 5,571,628 A | 11/1996 | Hackman | ...... | 428/605 |
| 6,458,732 B1 | * 10/2002 | Doza et al. | ...... | 501/94 |

* cited by examiner

*Primary Examiner*—Karl Group
(74) *Attorney, Agent, or Firm*—Porter, Wright, Morris & Arthur, LLP

(57) ABSTRACT

A dry refractory composition having superior resistance to crack propagation. The dry refractory composition includes at least matrix materials and metal fibers. The composition also may include dense refractory aggregate. The dry refractory composition is particularly suitable for use in metal containment applications.

28 Claims, 5 Drawing Sheets

ISOTHERMS: 1400°F 1000°F 600°F 200°F

ISOTHERMS: 1400°F 1000°F 600 F 200 F

CRACK-RESISTANT DRY REFRACTORY

BACKGROUND OF THE INVENTION

This invention relates to a dry refractory (i.e., a monolithic refractory installed in dry powder form without the addition of water or liquid chemical binders), particularly a dry refractory suitable for use in metal containment applications that provides superior resistance to crack propagation.

Refractories are widely used as working linings and secondary (safety) linings in the metal processing and related fields. These refractory linings contain molten metal and slag in metal processing and transfer vessels. Some refractory linings also are used to contain the heat and gases associated with metal processing operations within the vessels. As used herein, a "metal containment" application is one in which containment of molten metal and slag is of primary or even sole importance, while a "metal/heat containment" application is one in which both heat containment (insulation) of the vessel and containment of molten metal and slag are of interest.

Refractory linings for metal and heat/metal containment applications typically are consumable. They erode, crack, or otherwise are damaged by exposure to conditions within the vessel. When a certain amount of consumption of or damage to the refractory lining has occurred, repair or replacement of the lining is needed. Repair or replacement interrupts the metal processing operation, sometimes for an extended time. Some interruptions are unexpected while others are more or less predictable. Because repair or replacement of a refractory lining disrupts operations, it is desirable that the refractory lining perform in a predictable manner to allow for scheduled rather than emergency repairs.

Erosion of the refractory lining due to contact with the corrosive molten metal and slag results in a gradual consumption of the refractory lining. Erosion rates generally can be predicted by visual inspection of exposed portions of the vessel lining or other techniques. A predictable erosion rate can be established for a particular refractory lining based on the metal and thermal containment characteristics of the application and historical refractory consumption. For electric induction furnaces, the erosion rate can also be estimated by changes in electrical readings over time.

Cracking of a refractory lining results when a bonded, brittle refractory is subjected to thermal and mechanical stresses. These stresses commonly result from expansion and contraction of the lining as a result of changes in the thermal environment. Cracking allows molten metal and slag to infiltrate into the lining, resulting in an isolated failure area in the metal processing or transfer vessel. Failure of a refractory lining due to cracking is much less predictable than erosion. Cracks often do not occur in an exposed area of the refractory lining so visual inspection usually is not helpful in identifying cracking. The nature of the cracks that form in a refractory lining also may vary with the refractory composition and the thermal conditions. Refractory linings characterized by weaker bonds tend to form microcracks under stress while refractory linings characterized by stronger bonds tend to form macrocracks under stress. Macrocracking is particularly undesirable because it results from the failure of high strength bonds.

In addition to being unpredictable, cracking failures can be catastrophic. A macrocrack that extends completely through the lining from the hot face to the cold face (e.g., the steel shell side of a metal processing vessel) may allow molten metal and/or slag to reach the outer shell of the vessel by traveling through the crack. When this occurs, the molten materials can burn through the shell, which may result in extensive damage to equipment and/or injury to personnel. A burn-through of this type can cause long, unscheduled delays in the operation to make repairs to the lining, steel shell and structure, and any surrounding equipment.

Refractories also may be used in thermal insulation applications (in the metal processing field or otherwise) where repeated thermal shocks are expected. Such applications may include flue wall constructions and incinerators. Although erosion may occur in thermal insulation refractory applications in particularly corrosive environments, failure of thermal insulation refractories typically result from cracking caused by repeated thermal shocks.

Dry refractories, and particularly dry refractories that are installed using vibration to compact the dry refractory power, provide superior resistance to crack propagation compared to other types of conventional refractory linings such as castables, ramming materials, bricks, and refractory shapes. The superior crack resistance of dry vibratable refractory linings results from a unique bonding system that allows these linings to respond to the thermal conditions of the application by forming thermal bonds at controlled rates in predetermined temperature ranges. For example, in a metal containment application, the refractory lining responds to the thermal conditions of the associated molten metal vessel and any intrusions of molten metal and slag into the lining. The chemical and mineralogical compositions of dry vibratable refractories used in metal containment and heat/metal containment applications also may be selected to be resistant to specific types of metal and slags associated with particular processes.

An installed dry vibratable refractory initially exists in an unbonded state. In this unbonded state, it exhibits no brittle behavior. The unbonded dry refractory lining does not crack or fracture when subjected to external stresses but instead absorbs and distributes these stresses. As the unbonded installed refractory lining is exposed to heat, however, it begins to form thermal bonds. The region nearest the hot face tends to form strong thermal bonds. The strongly bonded refractory becomes dense and hard and is chemically and physically resistant to penetration by molten metal and slag.

The extent of the thermal bonding varies with the refractory composition and the thermal conditions present in a particular application. In some applications, essentially all of the refractory is expected to be strongly bonded and to exhibit brittle behavior. In other applications, the region furthest from the hot face is expected to remain in an unbonded or unsintered condition and the intermediate area is expected to form weak fritted thermal bonds. The refractory in the fritted and unsintered regions retains its fluid properties and forms an envelope that remains capable of absorbing mechanical and thermal stresses. Within this envelope, the strongly bonded refractory nearest the hot face may exhibit brittle behavior typical of conventional refractory compositions. However, this protective envelope may be degraded or even eliminated if the thermal conditions in the application cause bonding of the refractory in the fritted and unsintered regions.

The nature of the thermal bonding also varies with the refractory composition and the thermal conditions present in a particular application. Linings with weaker bonds tend to form microcracks under stress while linings with stronger bonds tend to form macrocracks under stress. As macrocracks form and molten metal and slag intrude into the refractory lining, the lining adjacent to the cracks respond to changes in thermal conditions and begin to form thermal bonds. As this cycle continues, the proportion of the refractory lining that exhibits brittle behavior progressively increases, driving the thermal plane of the lining toward the shell. If the lining has not failed or been taken out of service earlier as a result of erosion, eventually, the proportion of unbonded and weakly bonded refractory available to absorb and distribute stress is too small and failure of the lining results.

In view of the disadvantages of the prior art, a need exists for a dry refractory for metal containment applications that provides greater resistance to crack propagation, exhibits less brittle behavior when bonded, and has a longer service life.

It is an object of the invention to provide a dry refractory for metal containment applications that is resistant to crack propagation, and particularly macrocracking.

It is another object of the invention to provide a dry refractory for metal containment applications that exhibits less brittle behavior when the installed refractory has formed strong bonds in response to heat.

It is yet another object of the invention to provide a dry refractory for metal containment that provides a longer lining service life.

SUMMARY OF THE INVENTION

The foregoing objects are achieved in a dry refractory composition including metal fibers. The invention encompasses a dry refractory composition comprising a (1) a dry refractory mixture including a matrix material in an amount from 20 to 100 weight percent and a dense refractory aggregate in an amount from 0 to 80 weight percent; and (2) metal fibers in an amount of 0.5 to 15 weight percent of the dry refractory mixture. The matrix material has a particle size less than 100 mesh and the dense refractory aggregate has a particle size may greater than or equal to 100 mesh. The matrix material and dense refractory aggregate are selected so that when the composition is installed in powder form without addition of water or liquid chemical binders in a void adjacent to a heat source, at least a first portion of the composition near the heat source forms strong thermal bonds.

In a preferred embodiment, the matrix material and dense refractory aggregate are selected so that when the dry refractory composition is installed, a second portion of the composition further from the heat source than the first portion remains in an unsintered form. In another preferred embodiment, the matrix material is present in an amount of 20 to 60 weight percent and the dense refractory aggregate is present in an amount of 40 to 80 weight percent. The dry refractory mixture also may include a heat activated bonding agent in an amount from 0.1 to 8 weight percent or a dust suppressant in an amount sufficient to control visible and respirable dust during installation of the composition.

The metal fibers of the above-described composition may be stainless steel, carbon steel, a chromium alloy, a copper alloy, an aluminum alloy, a titanium alloy, or a mixture of these. The metal fibers preferably have a length of about ½ to about 2 inches.

The invention also encompasses an installed refractory composition. The above-described composition is installed in powder form without addition of water or liquid chemical binders in a void adjacent to a heat source such that at least a first portion of the installed composition near the heat source forms strong thermal bonds. In a preferred embodiment, a second portion of the composition further from the heat source than the first portion remains in an unsintered form.

The invention also encompasses as method of making a refractory composition. The method comprises the steps of selecting a dry refractory mixture including a matrix material in an amount from 20 to 100 weight percent and a dense refractory aggregate in an amount from 0 to 80 weight percent; selecting metal fibers in an amount of 0.5 to 15 weight percent of the dry refractory mixture; and blending the dry refractory mixture and the metal fibers in the absence of added water or liquid chemical binders. In this method, the matrix material and dense refractory aggregate are selected so that when the blended composition is installed in powder form without addition of water or liquid chemical binders in a void adjacent to a heat source, at least a first portion of the composition near the heat source forms strong thermal bonds. In a preferred embodiment, the method also includes the step of selecting the matrix material and dense refractory aggregate such that when the blended composition is installed, a second portion of the composition further from the heat source than the first portion remains in an unsintered form.

The metal fibers in the composition of the above-described method are selected from stainless steel, carbon steel, a chromium alloy, a copper alloy, an aluminum alloy, a titanium alloy, or a combination of these. The method may include the step of selecting metal fibers having a length of about ½ to about 2 inches.

The above-described method may include selecting a heat activated bonding agent in an amount from 0.1 to 8 weight percent of the dry refractory mixture and blending the heat activated bonding agent with the dry refractory mixture. The method also may include selecting a dust suppressant in an amount sufficient to control visible and respirable dust during installation of the composition and blending the dust suppressant with the dry refractory mixture.

The invention also encompasses a method of installing a refractory lining. The method comprises the steps of selecting a dry refractory mixture including a matrix material in an amount from 20 to 100 weight percent and a dense refractory aggregate in an amount from 0 to 80 weight percent; selecting metal fibers in an amount of 0.5 to 15 weight percent of the dry refractory mixture; blending the dry refractory mixture and the metal fibers in the absence of added water or liquid chemical binders; pouring the blended composition in powder form into a void adjacent to a heat source; de-airing the poured composition; and heating the de-aired composition such that at least a first portion of the composition near the heat source forms strong thermal bonds. The method also may include the step of selecting the matrix material and dense refractory aggregate such that when the de-aired composition is heated, a second portion of the composition further from the heat source than the first portion remains in an unsintered form. The metal fibers of the above described composition are selected from stainless steel, carbon steel, a chromium alloy, a copper alloy, an aluminum alloy, a titanium alloy, and combinations of these. The de-airing step also may include compacting the composition.

Also within the scope of the invention are a composition and methods for use in a metal contact electric induction furnace. One preferred embodiment of the invention is a dry refractory composition comprising (1) a dry refractory mixture including a matrix material in an amount from 20 to 100 weight percent and a dense refractory aggregate in an amount from 0 to 80 weight percent; and (2) metal fibers in an amount of 0.5 to 15 weight percent of the dry refractory mixture. The matrix material and dense refractory aggregate are selected so that when the dry refractory composition is installed in powder form without addition of water or liquid chemical binders in a void adjacent to the hot face of a metal contact electric induction furnace, at least a first portion of the composition near the hot face forms strong thermal bonds. Preferably the matrix material and dense refractory aggregate are selected so that when the dry refractory composition is installed, a second portion of the composition further from the hot face than the first portion remains in an unsintered form. The matrix material may be present in an amount of 20 to 60 weight percent and dense refractory aggregate may be present in an amount of 40 to 80 weight percent. The dry refractory mixture of the above-described composition may include a heat activated bonding agent in an amount from 0.1 to 8 weight percent.

The metal fibers are selected from stainless steel, carbon steel, a chromium alloy, and mixtures thereof. The metal fibers may have a length of about ½ to about 2 inches.

Another preferred embodiment of the invention is an installed refractory composition. The composition described above is installed in powder form without addition of water or liquid chemical binders in a void adjacent to the hot face of a metal contact electric induction furnace, such that at least a first portion of the installed composition near the hot face forms strong thermal bonds. Preferably, the matrix material and dense refractory aggregate are selected so that when the dry refractory composition is installed, a second portion of the composition further from the hot face than the first portion remains in an unsintered form.

Yet another preferred embodiment of the invention is a method of installing a refractory lining. The method comprises the steps of selecting a dry refractory mixture including a matrix material in an amount from 20 to 100 weight percent and a dense refractory aggregate in an amount from 0 to 80 weight percent; selecting metal fibers in an amount of 0.5 to 15 weight percent of the dry refractory mixture; blending the dry refractory mixture and the metal fibers in the absence of added water or liquid chemical binders; pouring the blended composition in powder form into a void adjacent to the hot face of a metal contact electric induction furnace; de-airing the poured composition; compacting the composition; and heating the de-aired composition such that at least a first portion of the composition near the hot face forms strong thermal bonds. The metal fibers are selected from stainless steel, carbon steel, a chromium alloy, and mixtures thereof. Preferably, the method also includes the step of selecting the matrix material and dense refractory aggregate such that when the de-aired composition is heated, a second portion of the composition further from the hot face than the first portion remains in an unsintered form.

These and further objects of the invention will become apparent from the following detailed description.

DETAILED DESCRIPTION OF THE PREFERRED EMBODIMENT(S)

Figure 1:
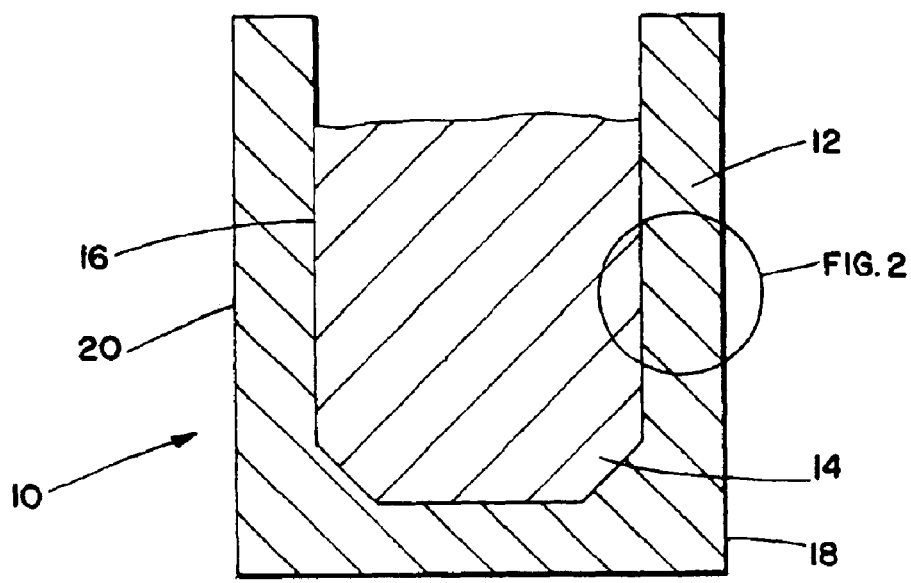
FIG. 1 is a schematic cross sectional view of a metal melting vessel having with a conventional dry vibratable refractory working lining.

The composition of the present invention is a monolithic refractory for installation in dry powder form without the addition of water or liquid chemical binders. The composition includes metal fibers that decrease the brittle characteristics of the bonded portion of the installed composition and resist cracking. Trial installations of dry refractory compositions including metal fibers have demonstrated improved service life compared to conventional dry vibratable refractories.

Dry refractory compositions that include metal fibers can be used in metal containment, metal/heat containment, and thermal insulation applications. These compositions are useful in installations including but not limited to coreless and channel electric induction furnaces, secondary linings in blast furnace troughs and ladles used in steel production, heat treat furnace floors, carbon bake furnaces, filter boxes in aluminum and magnesium melting, zoned linings in the upper portion of metal processing vessels (e.g., top caps), shaft furnaces, reverberatory furnaces, metal handling launder systems, and metal run out pits.

The refractory composition of the present invention is particularly suitable for use in metal containment applications. Refractory compositions particularly suitable for use in metal/heat containment and thermal insulation applications are the subject of our copending application titled "Crack-Resistant Insulating Dry Refractory," filed Feb. 7, 2003.

The dry refractory composition of the present invention includes at least matrix material and metal fibers. The composition also may include other refractory materials, particularly dense refractory aggregate. The dry refractory composition also may include a heat activated bonding agent to promote formation of strong bonds within the composition, a dust suppressant to control visible and respirable dust during installation of the composition in dry powder form, or both a bonding agent and a dust suppressant.

The metal fibers or needles may be of any suitable ferrous or nonferrous material, including but not limited to stainless steel, carbon steel, a chromium alloy, a copper alloy, an aluminum alloy, a titanium alloy, or a combination of these. The composition, number, and size of the metal fibers may be selected based on the chemical and thermal environment of the vessel. For example, fibers of a nickel-free chromium alloy rather than stainless steel may be used in refractories for magnesium processing operations to avoid contamination of the magnesium by nickel and fibers of a 406 Series alloy may be used in refractories for vessels with a hydrogen rich atmosphere. Use of a combination of fibers having different compositions may yield superior results.

The metal fibers useful in the practice of the invention preferably have a length of about ½ to about 2 inches, more preferably about ½ to about 1 inch. Use of a combination of fib lengths, whether of a single metal composition or a combination of metal compositions, may yield superior results. Commercially available metal needles typically vary in cross sectional size and configuration. Metal needles may be produced by stamping from sheet metal, resulting in deformed or undeformed slit sheet needle forms (available, e.g., Fibercon International, Inc., Evans City, Pa.), or by melt extractions, resulting in canoe-shaped needle forms (available, e.g., from Ribbon Technology Corp, Gahanna, Ohio). Typically, needle widths range from about 1/100 to about ⅛ inch, needle lengths range from about ½ to about 2 inches, range from about 4:1 to about 200:1. Variations in needle size and configuration within the above-described ranges do not appear to adversely affect the performance of the claimed refractory composition.

Metal fibers are present in the composition in an amount of about 0.5 to about 15 percent by weight of the dry refractory mixture. Fibers of heavier materials, such as steel, preferably are present in an amount of about 3 to about 10 weight percent, more preferably about 4 to about 7 weight percent. Fibers of lighter materials, such as aluminum alloys, preferably are present in smaller amounts, e.g., about 2 to about 5 weight percent, more preferably about 3 to about 5 weight percent, because the lower weights provide a sufficient number of needles. The metal fibers generally are added to the ingredients of the dry refractory composition during mixing.

The dry refractory mixture is designed or selected for a particular application based upon the chemical and thermal environment to which the refractory mixture will be exposed. Refractory mixtures for metal containment applications typically contain matrix material and dense refractory aggregate, while refractory mixtures for metal/heat containment and thermal insulation applications typically contain predominantly matrix material and filler lightweight material, with little or no dense refractory aggregate.

For metal containment applications, the chemical and thermal environment may be affected by (1) the boundary conditions relating to the dimensions of the shell and the desired capacity of the molten metal pool, (2) the identity and physical properties of the metal, and (3) the expected operating environment of the vessel, including its rated capacity, the presence of features such as oxygen injection, plasma torches, and water or air cooling devices, desired insulating value, campaign time, ease of repair, and material costs. Generally, materials are selected for the refractory composition such that the composition can tolerate the thermal environment of the vessel, maintain the structural integrity of any shell surrounding the vessel, and provide the desired insulating value. Conventional thermal analysis and lining design techniques are used to develop a thermal profile of the vessel based upon these factors.

Matrix material is selected to enhance performance of the composition in a particular service environment. For example, different matrix materials would be selected for use in refractories intended for use in iron melting, steel melting, and copper and aluminum molten metal containment. Matrix material is a natural or synthetic fine granular refractory capable of imparting good chemical and thermal resistance in the environment in which the composition will be used. The high surface area of the finely divided particles and the mineralogical composition of these particles promote bonding when the particles are exposed to heat.

Suitable matrix materials may include silicates, alumina-containing refractories, aluminosilicates, and alkaline earth aluminum silicates. Preferably, matrix material is selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon (silicon-aluminum oxynitride), titanium oxide, barium sulfate, zircon, a sillimanite group mineral, pyrophyllite, fireclay, carbon, wollastonite, calcium fluoride (fluorspar), spinel, chromium oxide, olivine, a calcium aluminate aggregate, an alumina-zirconia silicate, chromite, calcium oxide, dolomite, and other matrix materials known in the art. A combination of matrix materials may be used if desired.

The matrix material type and particle size selected may depend on the application, with more economical material being selected to maintain volume stability for nonmetal containment applications. Typically, the matrix material has a particle size of less than about 100 mesh, more preferably less than about 65 mesh, although other particle sizes may be used. The matrix material is present in an amount from about 20 to about 80 weight percent for metal containment applications and in an amount from about 15 to about 50 volume percent for metal/heat containment and thermal insulation applications.

The composition may include dense refractory aggregate, depending on the application and the characteristics of the other refractory mixture constituents. Dense refractory aggregate contributes to the structural integrity of the composition and typically is present in refractory compositions that will be exposed to corrosive molten metals such as iron and steel. Preferably at least a small amount of dense refractory aggregate is present in refractory compositions used in metal/heat containment and thermal insulation applications. Dense refractory aggregate may include natural or synthetic minerals, or a combination of the two. Natural minerals may include calcined fireclay, calcined Chamotte, a sillimanite group mineral, calcined bauxite, pyrophyllite, silica, zircon, baddeleyite, chromite, dolomite, and olivine. Synthetic minerals may include cordierite, silicon carbide, sintered alumina (e.g., tabular alumina), fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, and an alumina-zirconia silicate. A combination of dense refractory aggregates may be used to achieve particular results.

Typically, the particle size of the dense refractory aggregate will be greater than 100 mesh. Dense refractory aggregate may be present in an amount from about 0 to about 80 weight percent for metal containment applications and in an amount from about 0 to about 70 volume percent for metal/heat containment and thermal insulation applications.

The mineralogical composition of the matrix material and dense refractory aggregate may be identical, with the same refractory material performing the functions of providing the refractory body or skeleton and enhancing performance of the composition in the service environment. The larger particles, typically greater than about 100 mesh, function primarily as dense refractory aggregate that enhances the structural integrity of the composition and the smaller particles, typically less than about 100 mesh, more preferably less than about 65 mesh, function primarily as matrix material that provides good resistance to the chemical and thermal environment in which the composition will be used. Particles in the range of about 100 mesh may exhibit a secondary function in addition to their primary function; i.e., certain dense refractory aggregate particles in this size range may have bonding properties that enhance chemical and thermal resistance and certain matrix material particles in this size range may enhance structural integrity.

Filler lightweight material comprises an insulating refractory aggregate that reduces the density of the composition and enhances its thermal insulation properties. Filler lightweight material may be a natural or synthetic material, most typically a refractory oxide. More specifically, filler lightweight material may be selected from perlite, vermiculite, pumice, expanded shale (e.g., K T 200 and K T 500, available from K T Pumice, Inc.), expanded fireclay (e.g., CE Mulcoa 47LW available from C-E Minerals and Whi-Agg low iron aggregate available from Whitfield & Son Ltd.), expanded alumina silica hollow spheres (e.g., Fillite hollow ceramic microspheres available from Trelleborg Fillite, Inc. and Veri-lite aggregate available from A.P. Green Industries, Inc.), bubble alumina, sintered porous alumina (e.g., alumina catalyst), an alumina spinel insulating aggregate, a calcium aluminate insulating aggregate (e.g., Alcoa superlightweight aggregate SLA-92), expanded mullite, lightweight aluminosilicate, lightweight grog, and anorthite. Other insulating refractory aggregates or porous minerals (including synthetically expanded minerals) known in the art also may be used. A combination of filler lightweight materials may be used if desired.

Filler lightweight material typically has a particle size of about 3/8 inch or less. Filler lightweight material typically is not present in appreciable quantities in metal containment applications but is present in an amount from about 15 to about 85 volume percent, preferably about 50 to about 80 volume percent, in metal/heat containment and thermal insulation applications.

The characteristics of the filler lightweight material may vary with the application. In metal/heat containment applications, the filler lightweight material must have properties compatible with the metal, for example, an aluminosilicate insulating aggregate in iron containment applications, as well as desired heat containment properties. In thermal insulation application, the filler lightweight material may be selected for insulating value or even low cost. Filler lightweight material having micro pore sizes generally is preferred. It is easier to form bonds around micro pore size filler lightweight material in heat/metal containment applications and other demanding applications, resulting in a stronger bond framework. Filler lightweight materials having micro pore sizes also have higher insulating values.

Thermal bonding of the installed refractory composition may be accomplished by high temperature ceramic bonding of matrix material and any dense refractory aggregate in response to the thermal environment of the installed composition. For example, ceramic bonding of matrix material and any dense refractory aggregate may provide sufficient bonding in applications such as those in which bond formation is not desired until the composition reaches about 2000° F. or more. Accordingly, the presence of a discrete bonding agent is not necessary to the successful performance of the dry refractory composition.

If desired, however, the composition may contain at least one discrete heat activated bonding agent to control material strength and bond development after heat is applied to the installed refractory composition. The bonding agent may be selected based on the temperatures to which the application will be exposed, such that bonding may be substantially complete at temperatures as low as about 350° F. to as high as 1800° F. or more. Preferably, the bonding agent is nonliquid at room temperature, although addition of an atomized liquid bonding agent during preparation of the composition (not during installation) also may yield acceptable results. When used, the bonding agent typically is present in an amount from about 0.1 to about 8 weight percent for metal containment applications and from about 0.1 to about 15 volume percent for heat/metal containment and thermal insulation applications.

For applications in which a discrete heat activated bonding agent is used, the bonding agent may be a single bonding agent or a combination of bonding agents. The bonding agent may be an organic bonding agent, an inorganic bonding agent, or a combination of these. As described above, ceramic bonding of the matrix material and any dense refractory aggregate also may contribute to bonding of an installed refractory composition even when a discrete bonding agent is present.

Organic bonding agents, which typically are used for temperatures below about 600° F., develop strength during heating within the temperature range. Phenolic (phenol-formaldehyde) resin including novolac resin (a dry thermosetting phenol-formaldehyde resin) is a preferred organic bonding agent. Low phenol resins are particularly preferred. Other suitable organic bonding agents include furan resin, pitch, gilsonite, lignosulfonate, sugar, methyl/ethylcellulose, starch, and oxalic acid.

Inorganic bonding agents typically are used for bond development at temperatures greater than about 600° F. They promote the formation of glassy bonds at intermediate temperature ranges and ceramic bonds at higher temperature ranges. Suitable inorganic bonding agents include boron oxide, boric acid, cryolite, a noncalcium fluoride salt (e.g., aluminum fluoride or magnesium fluoride), a silicate compound (e.g., sodium silicate or potassium silicate), a borate compound (e.g., sodium borate or potassium fluoroborate), a phosphate compound (e.g., dry orthophosphate powder), a calcium silicate cement, a calcium aluminate cement, magnesium chloride, ball clay, kaolin, a sulfate compound (e.g., aluminum sulfate, calcium sulfate, or magnesium sulfate), a metal powder (e.g., powdered aluminum or silicon alloys), and refractory frit. Other agents recognized in the art as heat activated bonding agents also may be used.

Boron oxide and boric acid are particularly preferred inorganic bonding agents because they are effective and inexpensive. Refractory frit (particle size typically less than about 200 mesh) also is a preferred inorganic bonding agent. Low melting frits are preferred for applications requiring low temperature bonding and high melting frits are preferred for applications with higher service temperature limits.

The particle size of the bonding agents typically is less than about 100 mesh, more preferably less than about 60 mesh. Finer particles provide better dispersion but coarser particles may be more available or available at lower cost.

The dry refractory mixture also may include a small amount of a dust suppressant. The dust suppressant functions primarily to reduce visible dust to keep the installation environment clean and facilitate use. It also functions to maintain the airborne respirable dust levels of the materials in the composition below their respective exposure limits, although respirable dust particles tend to stick to larger visible dust particles when visible dust is present. A dust suppressant generally is necessary in compositions to be installed under conditions likely to result in generation of large quantities of dust, particularly large-scale installations and those without dust control ventilation systems. The dust suppressant is not necessary to satisfactorily contain molten metal or heat or provide thermal insulation, so the dust suppressant may be omitted. When used, the dust suppressant is present in an amount sufficient to control visible and respirable dust during installation of the composition, typically from about 0 to about 2 weight percent for metal containment applications and from about 0 to about 3 volume percent for metal/heat containment and thermal insulation applications.

Lightweight oil, such as mineral oil, is a preferred dust suppressant. The lighter the weight of the oil, the larger the quantity of dust suppressant likely to be needed to achieve satisfactory results. For example, a preferred embodiment of a dry refractory mixture for a metal/heat containment application may include lightweight oil in an amount from about 0.25 to about 1.6 volume percent. Other substances that reduce dusting without interfering with refractory performance, such as other lightweight oils, kerosene, glycols, and viscous organic polymers (preferably nonaqueous formulations), also may be used. A combination of dust suppressants, such as a mixture of lightweight oil and kerosene, may be used if desired.

A dry refractory composition for a metal containment application is described below:

(1) a dry refractory mixture including the following ingredients listed in approximate percent by weight

| Ingredient | Percent by Weight |
| --- | --- |
| matrix material | 20 to 100 |
| dense refractory aggregate | 0 to 80 |
| heat activated bonding agent | 0 to 8 |
| dust suppressant | 0 to 2; | and (2) metal needles in an amount of 0.5 to 15 weight percent of the above-described mixture.

Preferably, the above-described dry refractory mixture includes the following ingredients listed in approximate percent by weight:

| Ingredient | Percent by Weight |
| --- | --- |
| matrix material | 20 to 60 |
| dense refractory aggregate | 40 to 80 |
| heat activated bonding agent | 0 to 5 |
| dust suppressant | 0 to 2. |

A dry refractory composition for metal/heat containment and thermal insulation applications is described below:

(1) a dry refractory mixture including the following ingredients in approximate percent by volume:

| Ingredient | Percent by Volume |
| --- | --- |
| matrix material | 15 to 50 |
| filler lightweight material | 15 to 85 |
| dense refractory aggregate | 0 to 70 |
| heat activated bonding agent | 0 to 15 |
| dust suppressant | 0 to 3; | and (2) metal needles in an amount of 0.5 to 15 weight percent of the above-described mixture.

Preferably, the above-described dry refractory mixture includes the following ingredients in approximate percent by volume:

| Ingredient | Percent by Volume |
| --- | --- |
| matrix material | 15 to 35 |
| filler lightweight material | 35 to 75 |
| dense refractory aggregate | 0 to 65 |
| heat activated bonding agent | 0 to 10 |
| dust suppressant | 0 to 3. |

The dry refractory composition contains no added moisture or liquid chemical binders. The composition is not moisture bearing in its as-installed state. It is expected that the refractory composition as installed will contain less than about 0.5 weight percent water resulting from waters of hydration associated with refractory constituents and/or moisture absorbed from the environment, although this amount may vary with the specific refractory composition and environmental conditions during storage and installation.

The dry refractory composition may be prepared by combining the commercially available raw materials (preselected for the desired particle sizes) for the dry refractory mixture with the metal fibers in a mixer. The materials are mixed together to provide a substantially continuous distribution. The mixing process and equipment are typical of those used in known methods of making dry vibratable refractories. A dust suppressant may be added to the composition during mixing. An atomized dust suppressant also may be sprayed into the composition.

The refractory composition may be installed in the same way as a conventional dry vibratable refractory, by pouring it into place (e.g., in a void adjacent to a heat source) and then de-airing or densifying it. This may be accomplished by compacting the composition in place, for example, by vibration or ramming. For denser compositions, de-airing also may be accomplished by forking the composition (using a forking tool or similar apparatus) to remove air entrained in the composition during pouring. The removal of entrained air brings the particles into better contact with one another and provides particle packing sufficient to allow formation of strong bonds and the development of load bearing capability (if desired) in the bonded refractory.

Figure 2:
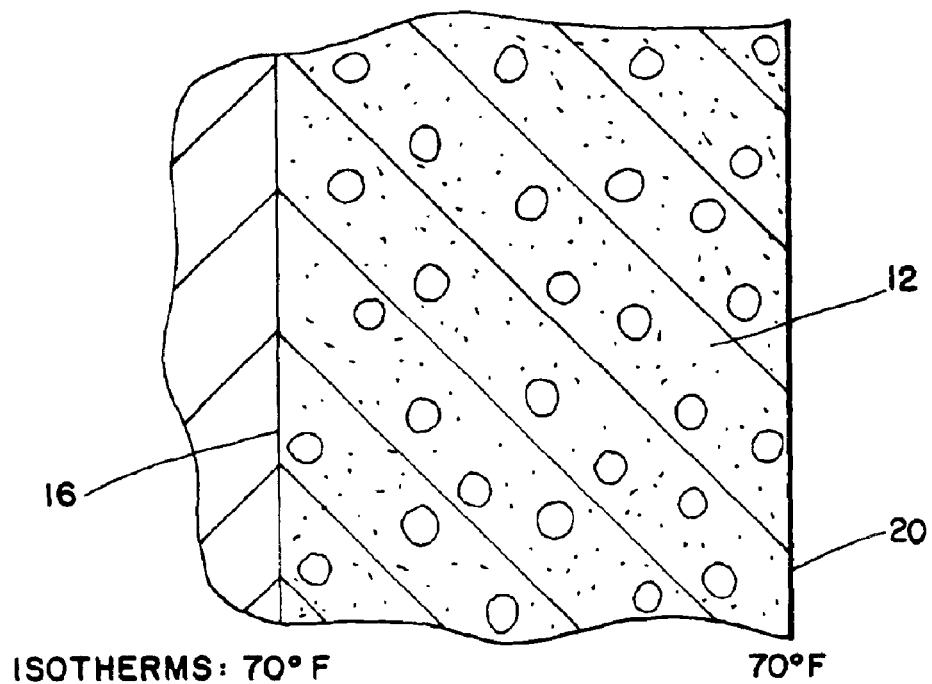
FIG. 2 is a partial diagrammatical view of the refractory lining of FIG. 1 before heating.

The differences between an installed conventional dry vibratable refractory and an installed refractory including metal fibers in a exemplary metal containment application may be seen with reference to FIGS. 1–6. FIG. 1 is a schematic cross sectional view of a metal melting vessel 10 having with a working refractory lining 12. The side of the lining nearest the pool of molten metal 14 is referred to as the hot face 16 and the side of the lining nearest the outer shell 18 that holds the lining in place before it is compacted is referred to as the cold face 20. For the purpose of this example, the vessel 10 is assumed to be a metal contact electric induction furnace containing molten aluminum 14 at a temperature of about 1400° F. FIG. 2 is a partial diagrammatical view of the refractory lining 12 of FIG. 1 before heating, illustrating the unsintered form of the refractory.

Before operating a newly lined or repaired vessel 10, the temperature of the lining 12 may be increased gradually toward the operating temperature. During this heat-up period, many desirable and consequential chemical and physical reactions may take place in the lining 12. The increasing temperature of the lining 12 may initiate or accelerate these reactions, including activation of any heat activated bonding agents present in the composition. Because no water or liquid chemical binders are present in the installed dry refractory lining 12, no prolonged drying step is needed between installation and heat-up.

The dry refractory composition preferably is selected with an appropriate sintering temperature range that will allow the formation of strong thermal bonds in a predetermined region of the installed refractory body 12. After installation, the refractory lining 12 will progressively form thermal bonds in response to exposure to heat.

Figure 3:
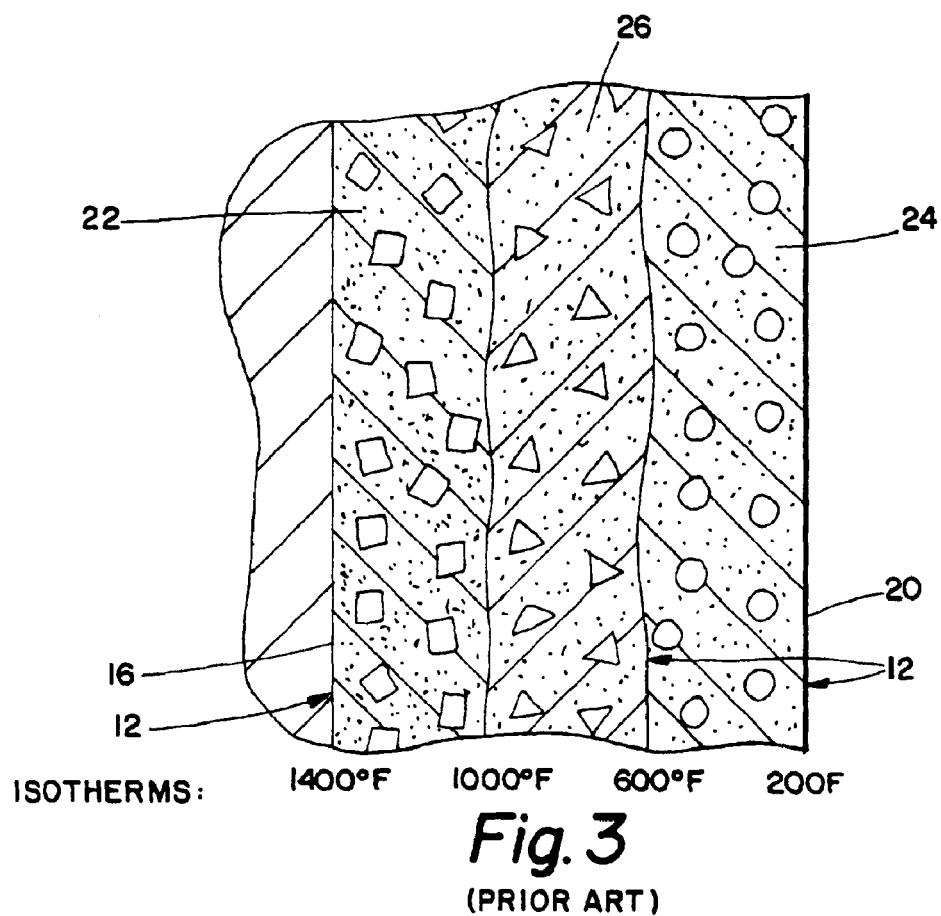
FIG. 3 is a partial diagrammatical view of the refractory lining of FIG. 1 after initial heating.
Figure 4:
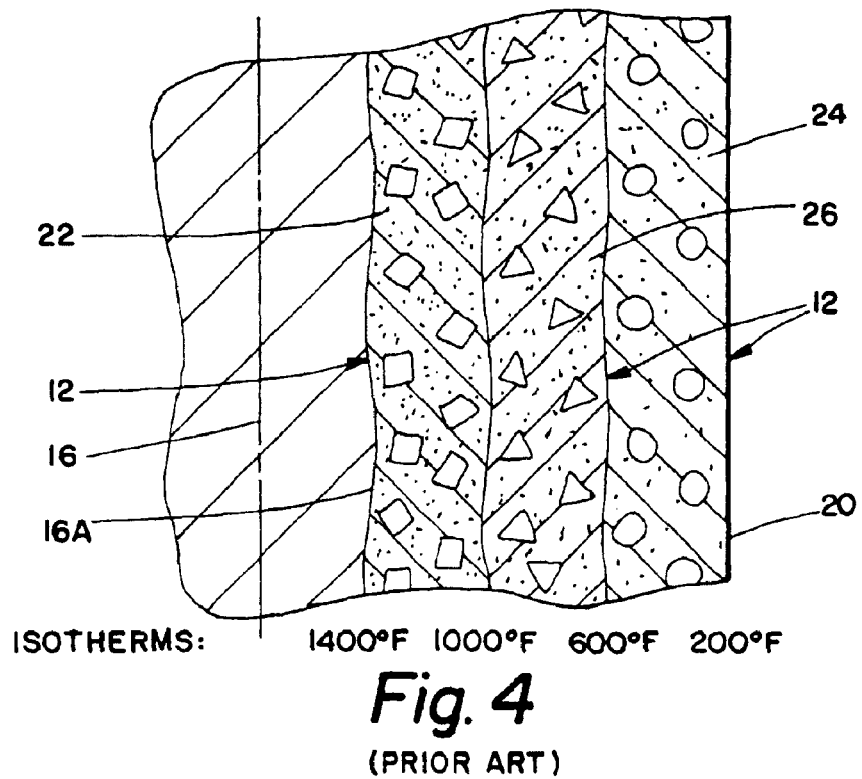
FIG. 4 is a partial diagrammatical view of the refractory lining of FIG. 3 after the lining has been in use for a time approaching its useful life.
Figure 5:
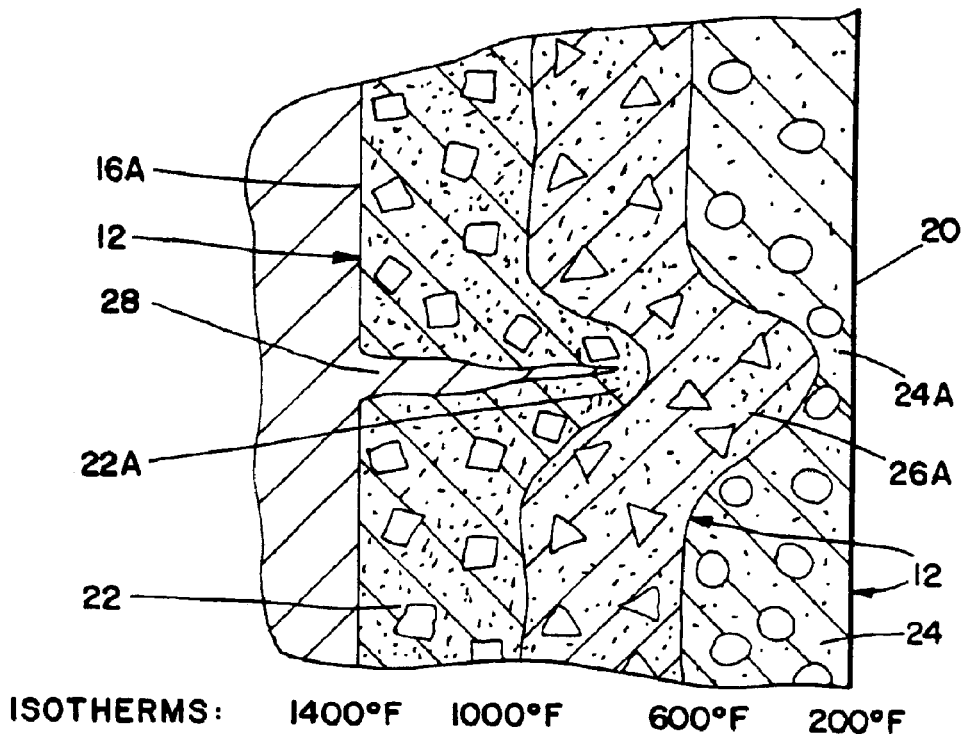
FIG. 5 is a partial diagrammatical view of the refractory lining of FIG. 3 showing the response of the lining to a crack.
Figure 6:
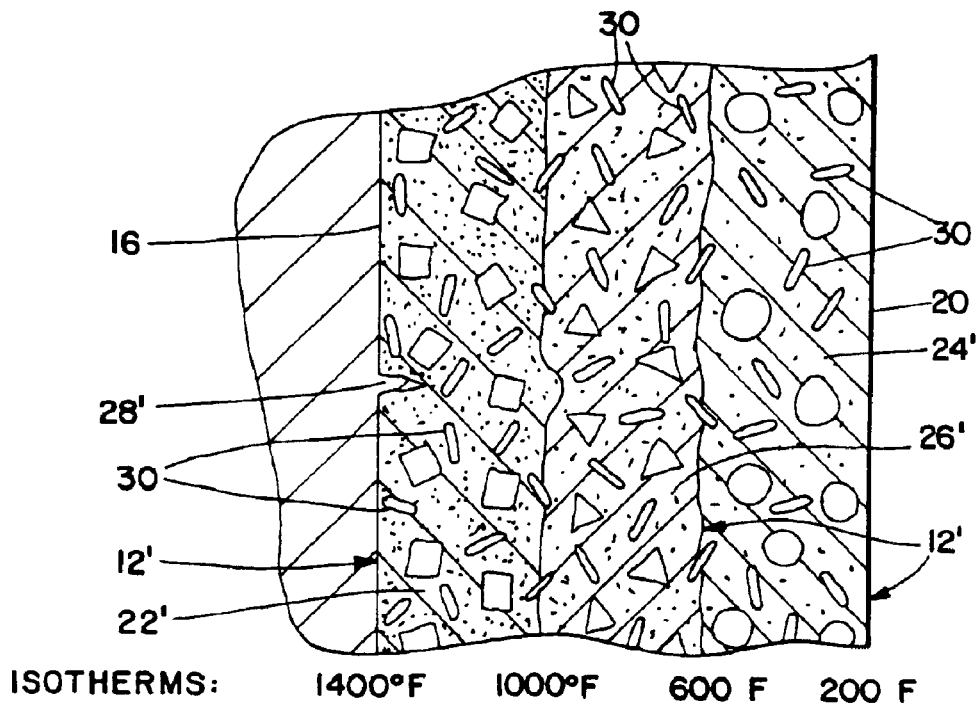
FIG. 6 is a partial diagrammatical view of a refractory lining including metal fibers installed in the vessel of FIG. 1, showing the response of the lining to a crack.

FIGS. 3–5 show the progressive bond formation in a conventional installed dry vibratable refractory lining 12 and FIG. 6 shows the progressive bond formation in an installed refractory lining 12' including metal fibers 30. The temperature gradient (also referred to as the thermal plane) of the lining 12, 12' from the hot face 16 to the cold face 20 is shown at the bottom of each diagram.

FIG. 3 is a partial diagrammatical view of the refractory lining 12 of FIG. 1 after initial heating. The region 22 of the lining 12 adjacent to the hot face 16 tends to form strong bonds, (i.e., bonds with a strength greater than about 1000 p.s.i. for an aluminum contact electric induction furnace application). The strongly bonded refractory 22 is dense and hard and may exhibit brittle behavior. The region 24 of the lining 12 furthest from the hot face 16 and adjacent to the shell 18 tends to remain in an unsintered condition (i.e., with a strength less than about 200 p.s.i. for an aluminum contact electric induction furnace application). The intermediate region 26 tends to form weak fritted bonds (i.e., with a strength greater than about 200 p.s.i. but less than about 1000 p.s.i. for an aluminum contact electric induction furnace application). The fritted 26 and unsintered 24 regions of the lining 12 retain their fluid properties and form an envelope that remains capable of absorbing mechanical and thermal stresses. For purposes of illustration, the regions 22, 24, and 26 characterized by differing bond strengths are shown as discrete areas with distinct boundaries. However, as described above, the bonds formed in the lining 12 in response to heat are progressive in nature such that a continuum of bond strengths exists from the hot face 16 to the unsintered refractory 24.

FIG. 4 is a partial diagrammatical view of the refractory lining 12 of FIG. 3 after the refractory lining 12 has been in use for a time approaching its useful life. The lining 12 has been eroded away from the original location of the hot face 16 to define a new hot face 16A and shift the thermal plane of the lining 12 toward the cold face 20. The remaining refractory still includes strongly bonded 22, fitted 26, and unsintered 24 regions.

FIG. 5 is a partial diagrammatical view of the refractory lining 12 of FIG. 3 in which a crack 28 has formed in the strongly bonded, brittle region 22, allowing molten metal 14 to penetrate deeply into the lining 12. In response to the thermal conditions resulting from this penetration, the refractory lining 12 has progressively formed additional thermal bonds 22A, 24A, 26A adjacent to the crack 28, causing a localized shift of the thermal plane of the lining 12. Propagation of the crack 28 has been stopped by the formation of new strong bonds 22A that provide good resistance to molten metal penetration, but only a thin layer of unsintered refractory 24A remains to absorb and distribute stresses.

The refractory lining 12' including metal fibers 30 exhibits the same characteristics as the conventional dry vibratable lining 12 shown in FIGS. 2–4 but responds differently to cracking. FIG. 6 is a partial diagrammatical view of an installed refractory lining 12' containing metal fibers 30, showing the response of the lining 12' to a crack 28'. The metal fibers 30 in the lining 12' resist propagation of the crack 28' such that the crack 28' penetrates only a short distance into the strongly bonded region 22'. Even if the crack had propagated into the lining 12' to the same extent shown in FIG. 5 such that only a thin layer of unsintered refractory 24' remained, the lining 12' is better able to absorb and distribute stresses because the strongly bonded region 22' is less brittle than that of the conventional refractory lining 12 shown in FIG. 5.

In the exemplary application described above, the thermal gradient was such that the continuum of bond strengths in the refractory lining 12 extended across three regions 22, 24, and 26, each characterized by a different bond strength. However, the thermal gradient need not extend across all three regions in every application. Depending on the design characteristics of the dry refractory and the thermal environment, the thermal gradient may be such that the installed lining 12 exhibits bond strengths in only two regions or even one region. In an application having a shallow thermal gradient, the installed lining may consist of strongly bonded and fritted regions, with essentially no unsintered refractory present. In an application having an even shallower thermal gradient, essentially all of the installed refractory may be strongly bonded. An installed refractory lining also may resist formation of strong bonds in the region nearest the hot face after the initial heat up and remain in unsintered form (or a combination of fritted and unsintered form), with strong bonds being formed in the region nearest the hot face only in response to a later change in thermal conditions, such as penetration of hot gases through cracks or joints in a working lining of a flue. The strength of the bonds formed in a particular region also may vary based on the characteristics of the refractory composition and the thermal environment of the application.

The number of bond strength regions in a particular application may even change in response to thermal conditions. In FIG. 5, the amount of unsintered refractory 24 in the vicinity of the crack 18 is small. Further crack propagation could result in bonding of all of the unsintered refractory 24 in this area.

While not wishing to be bound by theory, it appears that the metal fibers in the refractory lining both interfere with propagation of cracks and reduces the brittle nature (increase the tensile strength) of the strongly bonded region of the refractory lining. It appears that shorter fibers contribute more to interference with crack propagation while longer fibers contribute more to reduction of the brittle nature of the bonded refractory lining. Use of a combination of fibers having both long and short fibers may produce a refractory lining having optimal crack resistance.

Figure 7:
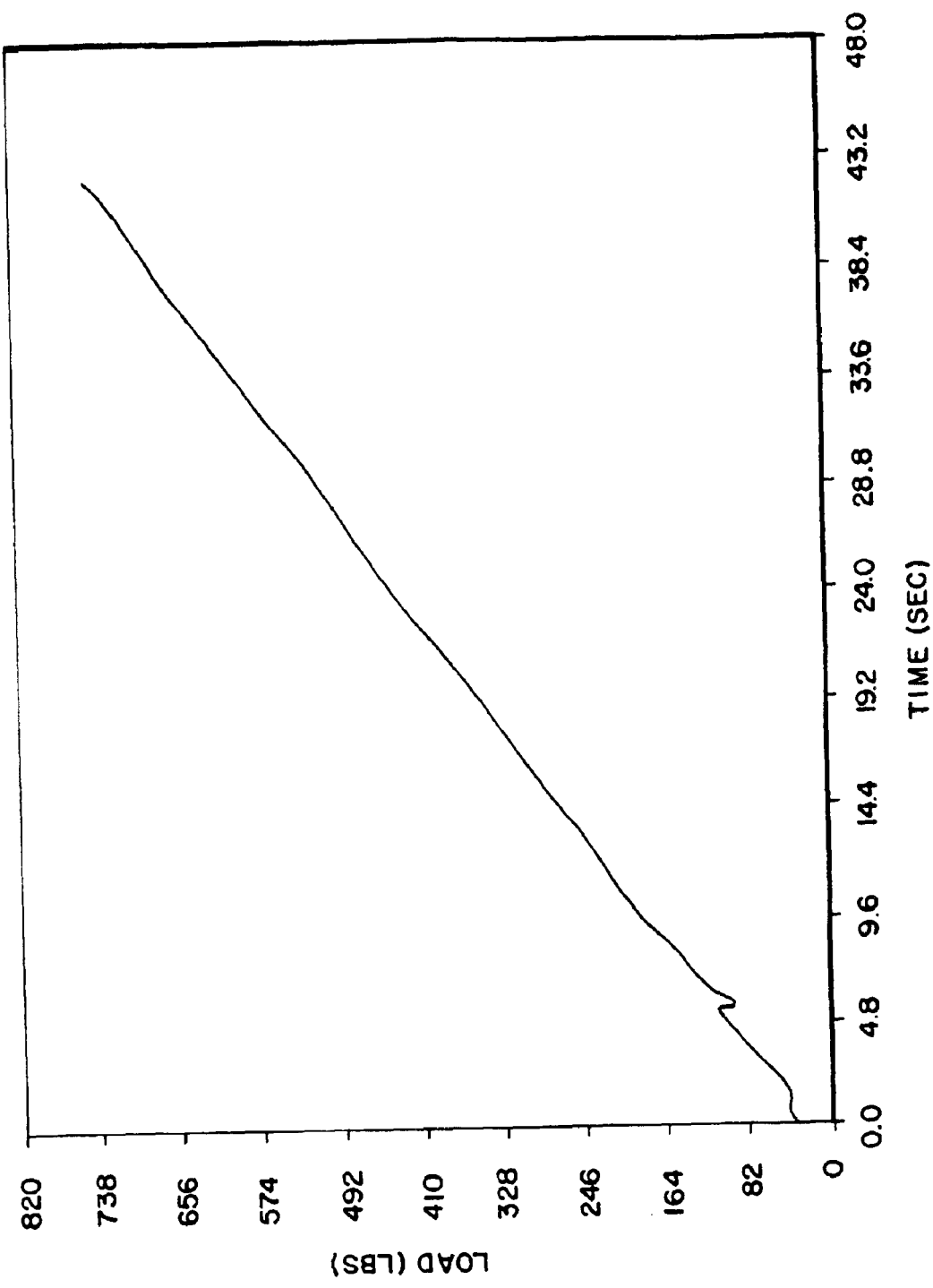
FIG. 7 is a bending strength curve for a conventional dry vibratable refractory.
Figure 8:
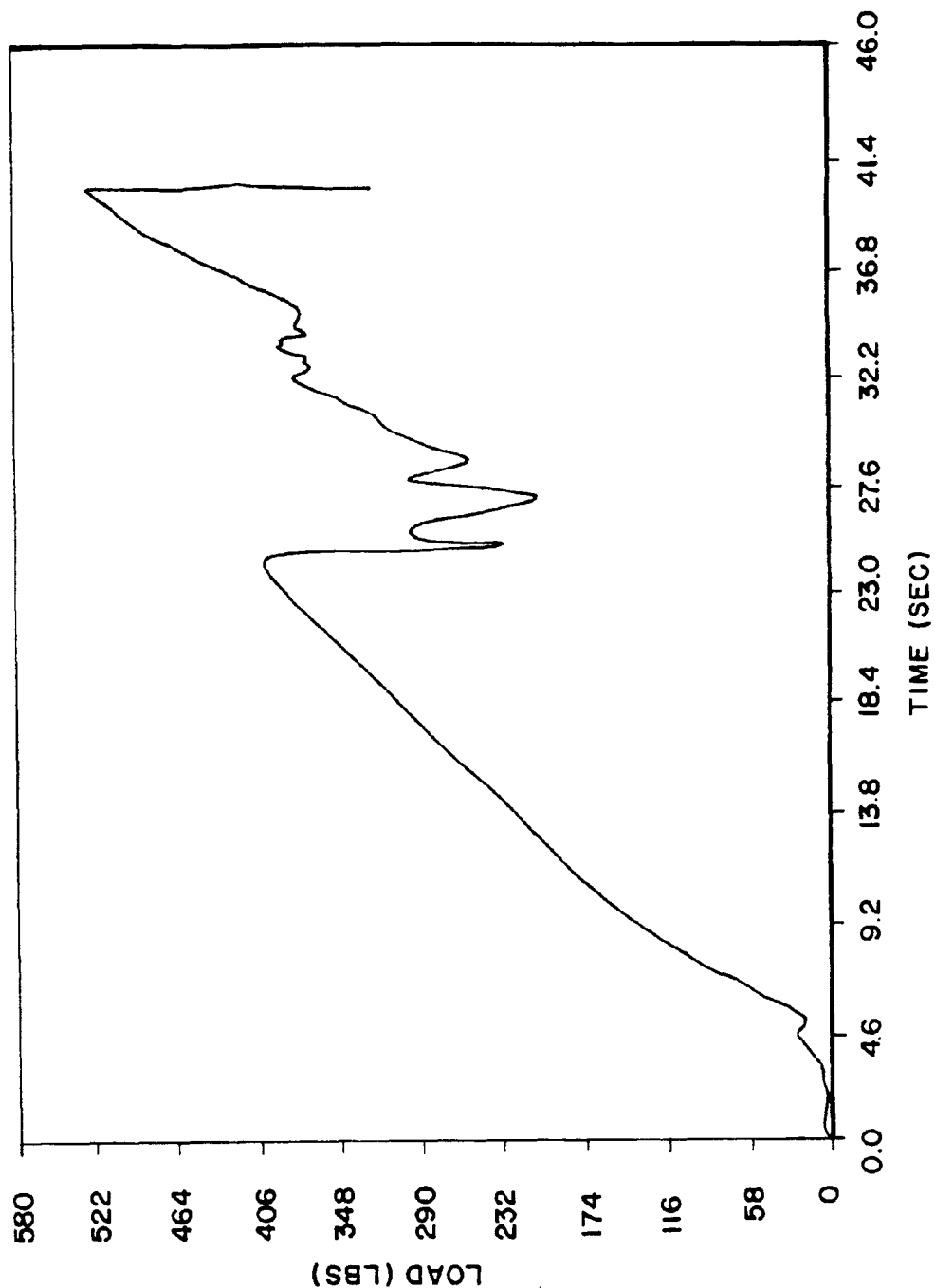
FIG. 8 is a bending strength curve for a dry vibratable refractory including metal fibers.

The performance of the refractory composition with metal fibers in response to stress differs markedly from that of conventional dry vibratable refractories. Bending strength curves for a conventional dry refractory composition and a dry refractory composition including metal fibers, respectively, as shown in FIGS. 7 and 8. A sample of a conventional dry vibratable refractory (Allied Mineral Products, Inc. Dri-Vibe 493A) was prepared by compacting the dry vibratable refractory, firing it to a temperature of 1800° F., and cooling it to room temperature. A sample of a dry vibratable refractory including metal fibers (modified Dri-Vibe 493A containing about 4.6 weight percent nickel-free chromium alloy fibers) was prepared by the same method. The bending strength of the samples at the same loading rate was determined using a 3-point modulus of rupture apparatus. As shown in FIG. 7, the conventional sample had a generally linear response to load over time before breaking in half. The refractory sample with metal fibers, shown in FIG. 8, had a more irregular response to load over time and bent without breaking. The irregular response is believed to be indicative of microcracking and bending.

Examples of refractory compositions suitable for particular applications follow.

EXAMPLE 1

A dry refractory composition for an aluminum contact coreless electric induction furnace was prepared by mixing the following ingredients of a dry refractory mixture:

| Ingredient | Percent by Weight |
| --- | --- |
| brown fused alumina, 5 + 10 mesh | 26.1 |
| brown fused alumina, 10 + 30 mesh | 27.1 |
| brown fused alumina, −30 mesh | 18.3 |
| brown fused alumina, −100 mesh | 8.1 |
| white fused alumina, −200 mesh | 8.1 |
| silica, −200 mesh | 4.0 |
| calcined alumina, −325 mesh | 5.4 |
| refractory frit, −100 mesh | 2.9; | with stainless steel needles in an amount of about 4.6 percent of the dry refractory mixture. Some in the electric induction furnace industry believed that such a refractory composition was unsuitable for use in an electric induction furnace due to the presence of electrical current in the refractory lining. Notwithstanding this, the refractory composition achieved satisfactory results when it was installed in an aluminum contact electric induction furnace, with no problems observed relating to electrical conductivity by the metal fibers.

EXAMPLE 2

A dry refractory composition for a magnesium contact electric induction furnace was prepared by mixing the following ingredients of a dry refractory mixture:

| Ingredient | Percent by Weight |
| --- | --- |
| brown fused alumina, 5 + 10 mesh | 18.7 |
| brown fused alumina, 10 + 30 mesh | 24.1 |
| brown fused alumina, −30 mesh | 14.4 |
| white fused alumina, −50 mesh | 5.3 |
| brown fused alumina, −200 mesh | 18.6 |
| calcined alumina, −325 mesh | 10.9 |
| calcined magnesia, −200 mesh | 4.8 |
| refractory frit, −100 mesh | 3.2; | with nickel-free chromium alloy needles in an amount of about 4.6 percent of the dry refractory mixture.

EXAMPLE 3

A dry refractory composition for a thermal insulation secondary lining in a flue wall subject to repeated thermal shocks was prepared by mixing the following ingredients of a dry refractory mixture:

| Ingredient | Percent by Volume |
| --- | --- |
| calcined flint clay, −4 mesh | 12.8 |
| sillimanite group mineral, −35 mesh | 4.8 |
| pyrophyllite, −16 mesh | 3.0 |
| perlite, −10 mesh | 77.0 |
| fireclay, −100 mesh | 1.0 |
| refractory frit, −100 mesh | 0.9 |
| mineral oil | 0.5; | with stainless steel needles in an amount of about 5 weight percent of the dry refractory mixture.

A refractory composition including metal fibers also has achieved satisfactory results as a secondary lining of a teeming ladle used in the refinement of steel. Typically, teeming ladles use refractory bricks as a secondary lining behind a brick working lining. Despite the presence of a secondary lining, the teeming ladle shell tends to become distorted by heat and mechanical stresses during use, making it difficult to fit bricks when replacement of the secondary lining is needed and gaps between the bricks can allow molten metal and slag to penetrate to the shell, resulting in further distortion. Use of a dry vibratable refractory containing metal fibers as the secondary lining in a teeming ladle provides a jointless lining with satisfactory resistance to molten steel and slag that can be installed by conventional dry vibratable methods, avoiding the need for time consuming fitting of bricks in the secondary lining. Use of a dry refractory containing metal fibers also enhances the service life of the secondary lining by reducing cracking related failures particularly during tear-out of the hot face.

Throughout this specification, when a range of conditions or a group of substances is defined with respect to a particular characteristic (e.g., temperature, volume percent and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly with respect to any subranges or subgroups therein.

Although specific embodiments of the invention have been described herein in detail, it is understood that variations may be made thereto by those skilled in the art without departing from the spirit of the invention or the scope of the appended claims. In particular, the presence in the refractory composition of incidental amounts of dry refractory constituent particles (e.g., matrix material, dense refractory aggregate, or filler lightweight material) having a size outside a specified range does not destroy the utility of the invention. Mixtures containing predominantly dry refractory constituent particles of the specified range and incidental amounts of dry refractory constituent particles outside the specified range are considered to be within the scope of the invention.

What is claimed is:

1. A dry refractory composition, comprising:
   a dry refractory mixture including
   a matrix material having a particle size less than 100 mesh in an amount from 20 to 100 weight percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon, titanium oxide, barium sulfate, zircon, a sillimanite group mineral, pyrophyllite, fireclay, carbon, wollastonite, calcium fluoride, spinel, chromium oxide, olivine, a calcium aluminate aggregate, an alumina-zirconia silicate, chromite, calcium oxide, dolomite, and mixtures thereof, and a dense refractory aggregate having a particle size greater than or equal to 100 mesh in an amount from 0 to 80 weight percent, the dense refractory aggregate being selected from calcined fireclay, calcined Chamotte, a sillimanite group mineral, calcined bauxite, pyrophyllite, silica, zircon, baddeleyite, chromite, dolomite, olivine, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, an alumina-zirconia silicate, and mixtures thereof, the matrix material and dense refractory aggregate being selected so that when the dry refractory composition is installed in powder form without addition of water or liquid chemical binders in a void adjacent to a heat source, at least a first portion of the composition near the heat source forms strong thermal bonds; and metal fibers in an amount of 0.5 to 15 weight percent of the dry refractory mixture.

2. The dry refractory composition of claim 1, wherein the metal fibers are selected from stainless steel, carbon steel, a chromium alloy, a copper alloy, an aluminum alloy, a titanium alloy, and mixtures thereof.

3. The dry refractory composition of claim 2, wherein the metal fibers have a length of about ½ to about 2 inches.

4. The dry refractory composition of claim 1, wherein the matrix material and dense refractory aggregate are selected so that when the dry refractory composition is installed, a second portion of the composition further from the heat source than the first portion remains in an unsintered form.

5. The dry refractory composition of claim 1, wherein the dry refractory mixture further comprises a heat activated bonding agent in an amount from 0.1 to 8 weight percent.

6. The dry refractory composition of claim 5, wherein the heat activated bonding agent is selected from boron oxide, boric acid, cryolite, a noncalcium fluoride salt, a silicate compound, a borate compound, a phosphate compound, a calcium silicate cement, a calcium aluminate cement, magnesium chloride, ball clay, kaolin, a sulfate compound, a metal powder, refractory frit, phenolic resin, furan resin, pitch, gilsonite, lignosulfonate, sugar, methyl/ethylcellulose, starch, oxalic acid, and mixtures thereof.

7. The dry refractory composition of claim 1, wherein the dry refractory mixture further comprises a dust suppressant in an amount sufficient to control visible and respirable dust during installation of the composition.

8. The dry refractory composition of claim 7, wherein the dust suppressant is selected from a lightweight oil, kerosene, a glycol, a viscous organic polymer, and mixtures thereof.

9. The dry refractory composition of claim 1, wherein the dry refractory mixture includes matrix material in an amount of 20 to 60 weight percent and dense refractory aggregate in an amount of 40 to 80 weight percent.

10. An installed refractory composition, comprising:
the dry refractory composition of claim 1 installed in powder form without addition of water or liquid chemical binders in a void adjacent to a heat source, at least a first portion of the installed composition near the heat source forming strong thermal bonds.

11. The installed refractory composition of claim 10, wherein a second portion of the composition further from the heat source than the first portion remains in an unsintered form.

12. A method of making a refractory composition, comprising:
selecting a dry refractory mixture including
a matrix material having a particle size less than 100 mesh in an amount from 20 to 100 weight percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon, titanium oxide, barium sulfate, zircon, a sillimanite group mineral, pyrophyllite, fireclay, carbon, wollastonite, calcium fluoride, spinel, chromium oxide, olivine, a calcium aluminate aggregate, an alumina-zirconia silicate, chromite, calcium oxide, dolomite, and mixtures thereof; and
a dense refractory aggregate having a particle size greater than or equal to 100 mesh in an amount from 0 to 80 weight percent, the dense refractory aggregate being selected from calcined fireclay, calcined Chamotte, a sillimanite group mineral, calcined bauxite, pyrophyllite, silica, zircon, baddeleyite, chromite, dolomite, olivine, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, an alumina-zirconia silicate, and mixtures thereof;
the matrix material and dense refractory aggregate being selected so that when the blended composition is installed in powder form without addition of water or liquid chemical binders in a void adjacent to a heat source, at least a first portion of the composition near the heat source forms strong thermal bonds;
selecting metal fibers in an amount of 0.5 to 15 weight percent of the dry refractory mixture, the metal fibers being selected from stainless steel, carbon steel, a chromium alloy, a copper alloy, an aluminum alloy, a titanium alloy, and mixtures thereof; and
blending the dry refractory mixture and the metal fibers in the absence of added water or liquid chemical binders.

13. The method of claim 12, further including the step of:
selecting metal fibers having a length of about ½ to about 2 inches.

14. The method of claim 12, further including the step of:
selecting the matrix material and dense refractory aggregate such that when the blended composition is installed, a second portion of the composition further from the heat source than the first portion remains in an unsintered form.

15. The method of claim 12, further comprising the steps of:
selecting a heat activated bonding agent in an amount from 0.1 to 8 weight percent of the dry refractory mixture, the heat activated bonding agent being selected from boron oxide, boric acid, cryolite, a noncalcium fluoride salt, a silicate compound, a borate compound, a phosphate compound, a calcium silicate cement, a calcium aluminate cement, magnesium chloride, ball clay, kaolin, a sulfate compound, a metal powder, refractory frit, phenolic resin, furan resin, pitch, gilsonite, lignosulfonate, sugar, methyl/ethylcellulose, starch, oxalic acid, and mixtures thereof; and blending the heat activated bonding agent with the dry refractory mixture.

16. The method of claim 12, further comprising the steps of:

selecting a dust suppressant in an amount sufficient to control visible and respirable dust during installation of the composition, the dust suppressant being selected from a lightweight oil, kerosene, a glycol, a viscous organic polymer, and mixtures thereof; and blending the dust suppressant with the dry refractory mixture.

17. A method of installing a refractory lining, comprising the steps of:

selecting a dry refractory mixture including a matrix material having a particle size less than 100 mesh in an amount from 20 to 100 weight percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon, titanium oxide, barium sulfate, zircon, a sillimanite group mineral, pyrophyllite, fireclay, carbon, wollastonite, calcium fluoride, spinel, chromium oxide, olivine, a calcium aluminate aggregate, an alumina-zirconia silicate, chromite, calcium oxide, dolomite, and mixtures thereof; and a dense refractory aggregate having a particle size greater than or equal to 100 mesh in an amount from 0 to 80 weight percent, the dense refractory aggregate being selected from calcined fireclay, calcined Chamotte, a sillimanite group mineral, calcined bauxite, pyrophyllite, silica, zircon, baddeleyite, chromite, dolomite, olivine, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, an alumina-zirconia silicate, and mixtures thereof;

selecting metal fibers in an amount of 0.5 to 15 weight percent of the dry refractory mixture, the metal fibers being selected from stainless steel, carbon steel, a chromium alloy, a copper alloy, an aluminum alloy, a titanium alloy, and mixtures thereof;

blending the dry refractory mixture and the metal fibers in the absence of added water or liquid chemical binders;

pouring the blended composition in powder form into a void adjacent to a heat source;

de-airing the poured composition; and heating the de-aired composition such that at least a first portion of the composition near the heat source forms strong thermal bonds.

18. The method of claim 17, wherein the de-airing step further comprises the step of:

compacting the composition.

19. The method of claim 17, further comprising the step of:

selecting the matrix material and dense refractory aggregate such that when the de-aired composition is heated, a second portion of the composition further from the heat source than the first portion remains in an unsintered form.

20. A dry refractory composition, comprising:

a dry refractory mixture including a matrix material having a particle size less than 100 mesh in an amount from 20 to 100 weight percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon, titanium oxide, barium sulfate, zircon, a sillimanite group mineral, pyrophyllite, fireclay, carbon, wollastonite, calcium fluoride, spinel, chromium oxide, olivine, a calcium aluminate aggregate, an alumina-zirconia silicate, chromite, calcium oxide, dolomite, and mixtures thereof; and a dense refractory aggregate having a particle size greater than or equal to 100 mesh in an amount from 0 to 80 weight percent, the dense refractory aggregate being selected from calcined fireclay, calcined Chamotte, a sillimanite group mineral, calcined bauxite, pyrophyllite, silica, zircon, baddeleyite, chromite, dolomite, olivine, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, an alumina-zirconia silicate, and mixtures thereof;

the matrix material and dense refractory aggregate being selected so that when the dry refractory composition is installed in powder form without addition of water or liquid chemical binders in a void adjacent to the hot face of a metal contact electric induction furnace, at least a first portion of the composition near the hot face forms strong thermal bonds;

and metal fibers in an amount of 0.5 to 15 weight percent of the dry refractory mixture, the metal fibers being selected from stainless steel, carbon steel, a chromium alloy, and mixtures thereof.

21. The dry refractory composition of claim 20, wherein the metal fibers have a length of about ½ to about 2 inches.

22. The dry refractory composition of claim 20, wherein the matrix material and dense refractory aggregate are selected so that when the dry refractory composition is installed, a second portion of the composition further from the hot face than the first portion remains in an unsintered form.

23. The dry refractory composition of claim 20, wherein the dry refractory mixture further comprises a heat activated bonding agent in an amount from 0.1 to 8 weight percent, the heat activated bonding agent being selected from boron oxide, boric acid, cryolite, a noncalcium fluoride salt, a silicate compound, a borate compound, a phosphate compound, a calcium silicate cement, a calcium aluminate cement, magnesium chloride, ball clay, kaolin, a sulfate compound, a metal powder, refractory frit, phenolic resin, furan resin, pitch, gilsonite, lignosulfonate, sugar, methyl/ethylcellulose, starch, oxalic acid, and mixtures thereof.

24. The dry refractory composition of claim 20, wherein the dry refractory mixture includes matrix material in an amount of 20 to 60 weight percent and dense refractory aggregate in an amount of 40 to 80 weight percent.

25. An installed refractory composition, comprising:
   the dry refractory composition of claim 20 installed in powder form without addition of water or liquid chemical binders in a void adjacent to the hot face of a metal contact electric induction furnace, at least a first portion of the installed composition near the hot face forming strong thermal bonds.

26. The installed refractory composition of claim 25, wherein the matrix material and dense refractory aggregate are selected so that when the dry refractory composition is installed, a second portion of the composition further from the hot face than the first portion remains in an unsintered form.

27. A method of installing a refractory lining, comprising the steps of:
   selecting a dry refractory mixture including
      a matrix material having a particle size less than 100 mesh in an amount from 20 to 100 weight percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, ferro silicon nitride, Sialon, titanium oxide, barium sulfate, zircon, a sillimanite group mineral, pyrophyllite, fireclay, carbon, wollastonite, calcium fluoride, spinel, chromium oxide, olivine, a calcium aluminate aggregate, an alumina-zirconia silicate, chromite, calcium oxide, dolomite, and mixtures thereof; and
      a dense refractory aggregate having a particle size greater than or equal to 100 mesh in an amount from 0 to 80 weight percent, the dense refractory aggregate being selected from calcined fireclay, calcined Chamotte, a sillimanite group mineral, calcined bauxite, pyrophyllite, silica, zircon, baddeleyite, chromite, dolomite, olivine, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, fused spinel, dense refractory grog, a chrome-alumina aggregate, a calcium aluminate aggregate, an alumina-zirconia silicate, and mixtures thereof,
   selecting metal fibers in an amount of 0.5 to 15 weight percent of the dry refractory mixture, the metal fibers being selected from stainless steel, carbon steel, a chromium alloy, and mixtures thereof;
   blending the dry refractory mixture and the metal fibers in the absence of added water or liquid chemical binders;
   pouring the blended composition in powder form into a void adjacent to the hot face of a metal contact electric induction furnace;
   de-airing the poured composition;
   compacting the composition; and
   heating the de-aired composition such that at least a first portion of the composition near the hot face forms strong thermal bonds.

28. The method of claim 27, further comprising the step of:
   selecting the matrix material and dense refractory aggregate such that when the de-aired composition is heated, a second portion of the composition further from the hot face than the first portion remains in an unsintered form.

* * * * *